Figure 3:
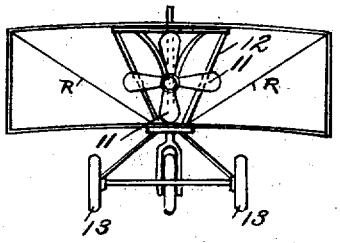

J. AND E. SHARP.

AEROPLANE.

APPLICATION FILED JULY 19, 1918.

Reissued Feb. 21, 1922. 15,291.

Inventor

John Sharp and
Edward Sharp.

Witness

H. C. Turner

Joseph Frease.

By Harry Frease

Attorney

UNITED STATES PATENT OFFICE.

JOHN SHARP AND EDWARD SHARP, OF CLEVELAND, OHIO.

AEROPLANE.

15,291. Specification of Reissued Letters Patent. Reissued Feb. 21, 1922.

Original No. 1,049,540, dated January 7, 1913, Serial No. 528,823, filed November 18, 1909. Application for reissue filed July 19, 1918. Serial No. 245,782.

*To all whom it may concern:*

Be it known that we, JOHN SHARP and EDWARD SHARP, citizens of the United States, and residents of Cleveland, in the county of Cuyahoga and State of Ohio, have invented certain new and useful Improvements in Aeroplanes, of which we hereby declare the following to be a full, clear, and exact description, such as will enable others skilled in the art to which it appertains to make and use the same.

The objects of the invention are to provide an aeroplane flying machine with a large area of lifting surface and with a long edge exposed to the wind in the smallest possible compass, and to in this manner avoid a cumbersome and unwieldy form of construction and to economize space.

The invention has for its further objects, to divide up the lifting area into many connected portions, at different levels and to alternate or "stagger" the smaller planes or vanes thus obtained in their vertical relations, thus affording a larger number of supporting points or surfaces, aggregating in all a large area for support, and procurring thereby a more perfect resistance to tipping influences in any one direction, and making the balance more perfect and harder to overcome since the full area of all the planes will be acting upon the air at all times.

The gaps between the planes when the machine is in motion permit the air to rush through between the upper and lower planes at many points and the strong columns of air thus produced have a steadying and lifting effect upon the machine for the reason that air rushing between the upper and lower planes, leaping the gaps or spaces between the planes creates a strong downward draft between the planes. These downward streams and the streams rushing between the upper and lower planes meeting, cause a whirling and upward push upon the planes back of the gaps which assists in keeping the machine floating in the air. In falling, soaring and gliding the full area of all the planes is acting upon the air causing the air to flow from lower planes to upper planes before escaping to the rear, giving a parachute effect to prevent rapid falling.

The invention includes corrugating or fluting the planes on the lower side with the corrugations extending in the direction of motion. With these planes there is no resistance to the forward movement through the air, and in soaring or gliding the air will be compelled to follow the direction of the corrugations and will therefore flow either toward the front or rear and cannot escape at the tips or edges of the planes.

The forms of construction described increase the stability of the machine and its buoyancy and utilize the resistance of the air in falling, so that the machine will rise more readily and will stay in the air with the application of less power than with differently constructed planes, also the length of the wind edge is increased without increasing the apparent dimensions of the machine.

A further feature of the device is included in the tandem compound propeller by means of which the effective pulling power is increased with a given diameter of blades. The advantage found in this construction of propeller is in obtaining the same effect that would be found in using a single propeller of twice the diameter, and further the wind will not interfere so with the action of the blades, and will not have as much action or leverage upon them, to disturb the movements of the machine. The propeller is also condensed in form and will exert a strong pulling effect and hence can be run faster and can be built stronger.

Further objects of the invention are to provide a light portable form of frame for the machine in which the engine and operator can be supported and which is preferably divisible into two or more portions for packing and transportation.

The invention further comprises the combination and arrangements of parts and construction of details, as hereinafter described, shown in the accompanying drawings and specifically pointed out in the claims.

Figure 1:
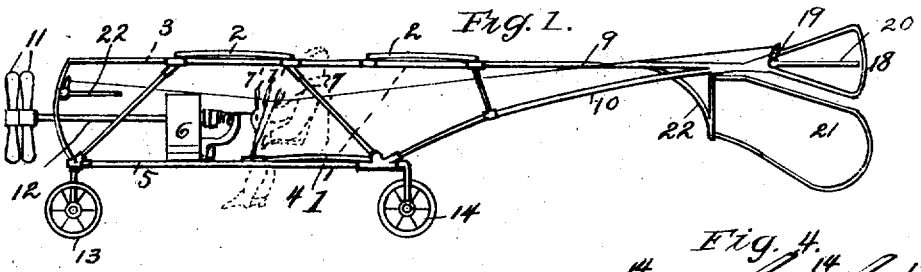
Figure 4:
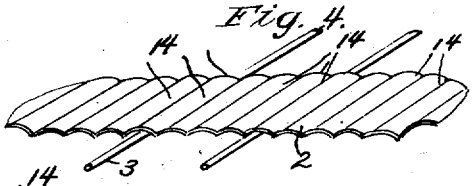
Figure 2:
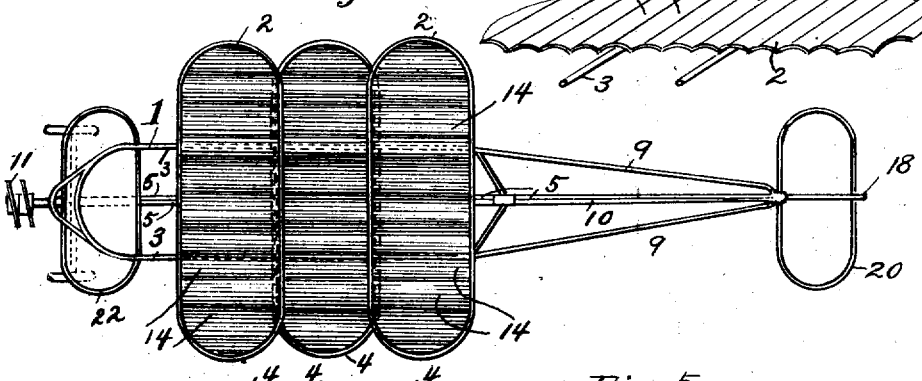
Figure 5:
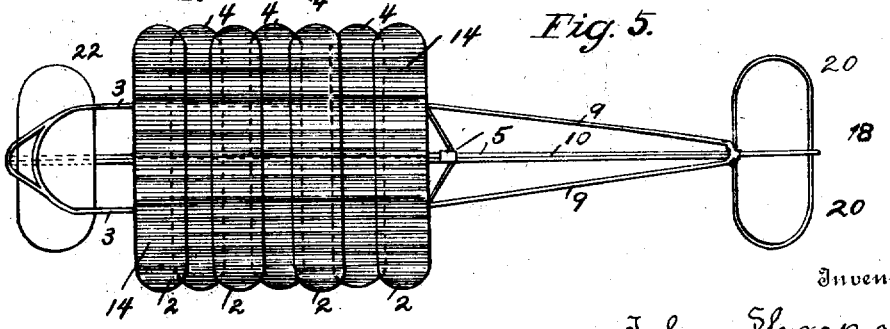

In the accompanying drawings, Figure 1 is a side elevation of the device; Fig. 2 is a plan view thereof; Fig. 3, is a front elevation thereof; Fig. 4 is a perspective view of one of the corrugated planes; Fig. 5 is a plan view showing a multiplication of the staggered planes, to increase the buoyant effect.

In these figures 1, is a frame, preferably prism shaped and constructed of tubular parts joined together in the manner of a bicycle frame and formed in two longitudinal portions joined on the center line so as to be readily taken apart if desired, 2, 2, are an upper set of planes attached to the upper bars 3, 3, of the frame and spaced apart approximately the width of one plane. Immediately below this space between the planes is secured the lower plane 4, mounted upon a central bar or bars 5, which is bifurcated at this point to afford a broad support for the lower plane. Upon this broadened support the engine 6 can also be placed and the operator can be provided with a seat upon the lower plane, where the engine levers such as shown at 7, 7, can readily be manipulated, and also levers 7′ 7′ for manipulating the steering planes and rudder.

Suitable bracing and tension rods R may be employed to connect the frame and planes whenever desired. A rearwardly extending portion 9 of the frame braced at 10, is pointed at the end and is terminated by the arc shaped guard 18, in which is pivoted at 19 the steering plane 20. Upon a rudder post or bracket 22 depending from the rear extension 9, is also hinged the rudder 21. A front steering plane 22 is also shown. The propellers 11, 11, are arranged in tandem upon a common propeller shaft 12, and are preferably located in the front of the machine. A pair of wheels 13 in front and a single wheel 14 in the rear upon the lower part of the frame serve to support the machine upon the ground and assist in obtaining the start. The planes are preferably corrugated as shown at 14, 14, Fig. 4. The planes may be multiplied in number as shown in Fig. 5 to divide up the area in small portions so as to increase the efficiency of the device in stability and buoyancy and the same staggered relation between the upper and lower planes is retained as when a smaller number of planes are employed. The frame parts are conveniently connected together by any suitable clamps and sockets or other rigid connecting parts, and the frame is preferably of prism shape with an extended and pointed rear extremity.

We do not limit ourselves to the exact forms of structure herein described, but many minor modifications can be made and still be within the scope of the claims; for instance there may be any number of upper and lower staggered planes, and the frame may include any number of upper or lower bars, and bracing devices, and supports for the engine and operator, or other minor changes.

The aeroplane when in the air is so balanced that it or its planes will be slightly inclined upward, so that the current of air from the propeller will impinge against the lower surfaces of the upper planes, and thus the propeller will assist in lifting as well as in driving the machine forward. The tandem propeller is of particular advantage for this use since it is of condensed form and the current of air produced thereby will be compressed within small compass and will be entirely included between the upper and lower planes, whereas if single propeller were employed with proportionately longer vanes, the air current would be distributed too widely to have its full lifting effect upon the upper planes.

As shown in the drawings, when more than one plane is used at either one of the different levels, the same are preferably spaced apart less than the width of the opposed plane at the other level, thus causing the plane or planes at one level to overlap in staggered relation the plane or planes at the other level, which overlapping relation of the staggered planes leaves no perpendicular clearance between the transverse edges of the planes at the different levels and causes a plane at one level to engage the air before it is engaged by a plane at another level and also causes the one plane to release the air before it is released by the other plane.

Furthermore, the overlapping of a plane at one level with a plane at another level, serves to steady the machine in moving through the air, even though only one plane is employed in each level, because the air between the planes is caught or engaged by the plane at one level before it loses contact or engagement with the plane at the other level, and this is true whether the plane at an upper level is located in forward or positive or rearward or negative overlapping staggered relation with respect to the plane at a lower level.

Further, the planes at different levels stagger in their vertical relation to or with each other, which staggered relation of the planes in their vertical relation at different levels causes the planes to lead and lap each other transversely of the longitudinal axis of the body, also retaining a partial vertical relation of the opposed transverse planes at the different levels, causing overlapping of planes in staggered relation and retaining a partial vertical relation to or with each other.

Thus, one of the transverse edges of a plane at one level, is intermediate of the two transverse edges of a plane at another level, which causes the transverse edges of a plane at one level, to stagger in relation to or with the transverse edges of a plane at another level, and at no time is the whole width of a plane at one level wholly outside the width of an opposed plane at another level, the planes at different levels retaining a partial vertical relation with respect to their widths; this causes a transverse portion of a plane at one level to be vertically above or below a transverse portion of an opposed plane at another level.

As this is true, the planes may be so used in any number from two up, which is the smallest number that can be used, and still retain a partial vertical relation and an overlapping staggered relation to or with each other at their different levels and at no time is the whole width of the opposed planes in a direct vertical relation above or below each other with respect to their widths.

Also, the planes at different levels stagger in their vertical relations to or with each other, which causes the planes to lead and lap in a forward or rearward direction longitudinally of the body.

Therefore, one of the edges of a plane at one level is intermediate of the forward and rearward edges of a plane at another level, also the edges of a plane at one level, stagger to or with the edges of a plane at another level in forward and rearward direction. As this is true, two planes are the smallest number of planes that can be used and staggered in their vertical relations to each other in overlapping staggered relation at different levels.

Having described the invention what we claim as new and desire to secure by Letters Patent is:

1. In an aeroplane, in combination, a prism shaped frame formed of tubular parts and divisable into longitudinal portions, an extended rear portion, a series of planes secured to the upper side of the frame, a series of similar planes secured to the lower side thereof, said planes spaced apart and the lower planes staggered in relation to the upper planes, and horizontal steering planes pivotally secured to the extremity of said frame.

2. In an aeroplane, in combination, a frame, horizontal planes rigidly secured therein at different levels, the edges of the planes at one level intermediate and staggered in relation to or with the edges of the planes in another level, each lower plane immediately below the space between the upper planes, and steering planes and rudder pivotally secured to said frame.

3. In an aeroplane, in combination, a frame, horizontal planes secured therein at different levels, the edges of the planes in one level intermediate in relation to and staggered to or with the edges of the planes in an adjacent level, said planes corrugated in the direction of flight of the aeroplane, and steering and propelling devices secured to said frame.

4. In an aeroplane, a prism shaped frame in two longitudinal portions secured together, and a pointed rear portion, a rudder bracket secured to the rear frame, and a rudder pivoted thereto, a horizontally pivoted steering plane in the front and rear of said frame, and horizontal planes secured to said frame at different levels, the planes at one level having a staggered relationship to the planes at the other level.

5. In an aeroplane, the combination with planes, arranged at upper and lower levels, the edges of the lower planes being intermediate of, and staggered to or with the edges of the upper planes, of rotatable propellers, arranged intermediate of the upper and lower planes, and adapted to force the current of air against the upper planes, and supporting frame for said planes and propeller.

JOHN SHARP.
EDWARD SHARP.